United States Patent [19]

Lagakos et al.

[11] Patent Number: 4,482,205
[45] Date of Patent: Nov. 13, 1984

[54] TEMPERATURE-INSENSITIVE OPTICAL FIBERS

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 432,215

[22] Filed: Oct. 1, 1982

[51] Int. Cl.$^3$ .............................................. G02B 5/172
[52] U.S. Cl. ........................... 350/96.34; 350/96.33; 501/37
[58] Field of Search ............... 350/96.29, 96.30, 96.31, 350/96.33, 96.34; 501/37

[56] References Cited

U.S. PATENT DOCUMENTS

| | | | |
|---|---|---|---|
| 4,089,586 | 5/1978 | French et al. | 350/96.30 |
| 4,213,672 | 7/1980 | Aulich et al. | 350/96.23 |
| 4,265,667 | 5/1981 | Ikeda et al. | 106/47 Q |
| 4,295,739 | 10/1981 | Meltz et al. | 350/96.33 X |
| 4,373,768 | 2/1983 | Clarke | 350/96.34 |
| 4,417,782 | 11/1983 | Clarke et al. | 350/96.29 |
| 4,432,606 | 2/1984 | Blair | 350/96.33 |

OTHER PUBLICATIONS

Waxler et al., J. Res. NBS 77A:6, pp. 755-763, Nov.--Dec., 1973.
Waxler et al., J. Res. NBS 75A:3, pp. 163-174, May--Jun., 1971.
Ramaswamy et al., App. Opt. 18:24, pp. 4080-4084, Dec. 15, 1979.
Lagakos et al., App. Opt. 20:13, pp. 2305-2308, Jul. 1, 1981.

*Primary Examiner*—John Lee
*Attorney, Agent, or Firm*—Robert F. Beers; William T. Ellis; Thomas E. McDonnell

[57] ABSTRACT

A temperature-insensitive fiber comprises a lightpropagating core having $$1/n \left( \frac{\partial n}{\partial T} \right)_\rho$$

not in excess of $5.5 \times 10^{-6} K^{-1}$, wherein n represents the refractive index, T represents the temperature, and ρ represents the density of the core material, a cladding layer on the core with a Poisson ratio about equal to that of the core; a substrate layer on the cladding layer having a Young's modulus greater than that of the core, a Poisson ratio about equal to that of the core, thermal expansion co-efficient not more than one fourth of that of the core, and a thickness of at least five times greater than the radius of the core; and an elastomeric protective layer on the substrate layer.

13 Claims, No Drawings

TEMPERATURE-INSENSITIVE OPTICAL FIBERS

BACKGROUND OF THE INVENTION

This invention pertains generally to optical fibers and more particularly to optical fibers with reduced temperature sensitivity.

An optical fiber is generally a composite construction comprising a light-propagating core, at least one outer layer, often referred to as cladding, one of which has an index of refraction lower than that of the core, and usually one or two protective coatings. If two or more outer layers are used, the last layer is often referred to as the substrate. The protective coating is usually plastic or metal. For example U.S. Pat. No. 4,213,672 by Aulich et al. discloses a single and a double plastic protective coating.

Performance of an optical fiber is improved by either improving the properties of the core or one of the layers or making certain matches of properties between the core and the different layers. Two examples of borosilicate optical fibers having variations in compositions to improve the optical fiber. are given. In U.S. Pat. No. 4,089,586 by French et al., the ratio of $SiO_2$ and $B_2O_3$ in the core and cladding is varied, but is never less than 3:1, to produce a single mode optical transmission. A multi ingredient borosilicate glass having no more than 15 weight percent of $B_2O_3$ is disclosed in U.S. Pat. No. 4,265,667 by Ikeda et al.

Temperature response of optical materials has been studied and researched for many years, but recently the research has increased significantly. The following are examples of recent work. In Roy M. Waxler and G. W. Cleak "The Effect of Temperature and Pressure on the Refractive Index of Some Oxide Glasses" J. Res. NBS 77A-6, p. 755-63, Nov.-Dec., 1973, the effect of temperature on the index of refraction is noted and the resulting adverse effect on light scattering is noted. However, no solutions to this problem are given. An earlier study on the effect of temperature and photoelastic constants on the index of refraction is given in R. M. Waxler et al. "Optical and Mechanical Properties of Some Neodymium-Doped Laser Glasses" J. Res. NBS 75A:3, p. 163-74, May-June, 1971. A mismatch between a borosilicate elliptical cladding and a pure silica outerjacket is reported in, V. Ramaswamy et al. "Birefringence in Elliptically Clad Borosilicate Single-Mode Fibers" App. Opt. 18:24, p. 4080-4, Dec. 15, 1979, to cause stress-induced strain birefringence.

Only until recently has much research been undertaken concerning the temperature sensitivity of the phase of light propagating in an optical fiber. An example of this work is N. Lagakos et al. "Temperature-Induced Optical Phase Shifts in Fibers" App. Optics 20:13, p. 2305-8, July 1, 1981, which discusses maximizing the temperature sensitivity of the fibers.

This sensitivity can be an important consideration in optical fiber design. In communication systems, changes in phase can deteriorate the signal in high-bandwidth communications. Temperature-induced phase shifts add to the noise of fiber sensors, e.g. acoustic, magnetic, and gyros. Similar problems exist with fiber-optic temperature sensors in that the sensing fiber should be temperature sensitive, but the optical fiber lead and reference fiber should not be.

SUMMARY OF THE INVENTION

It is, therefore, an object of this invention to fabricate optical fibers with reduced thermal sensitivity.

A further object of this invention is to minimize the phase shift of light propagating in a composite optical fiber.

These and other objects are achieved by a composite optical fiber comprising a light-propagating core having a minimum variation of the index of refraction with temperature at constant density and at least one outer layer capable of restricting the axial expansion of the core rod without interfering with any radial expansion of the core.

DETAILED DESCRIPTION OF THE INVENTION

An optical fiber according to the present invention comprises a light-propagating core, generally two outer layers and a protective layer. The composition of the different layers is selected and matched in the following manner in order to significantly reduce the sensitivity of the fiber to temperature.

The core comprises a material having an optical clarity sufficient to propagate light over the desired length. In communications, this length would be several kilometers. For sensor fibers the length may be only a meter or less. This property, like tensile strength and other processability properties, has values comparable to presently used optical fibers. The critical property for the core material is the parameter $$1/n \left( \frac{\partial n}{\partial T} \right)_\rho$$

which does not exceed $5.5 \times 10^{-6} K^{-1}$, preferably $4.5 \times 10^{-6} K^{-1}$, and most preferably $3.5 \times 10^{-6} K^{-1}$ and in which n represents the refractive index, T represents the temperature, and $\rho$ represents the density of the core material. Values slightly in excess of $5.5 \times 10^{-6} K^{-1}$ would have some reduction in temperature sensitivity, but fibers with such a value would have little utility as temperature-insensitive fibers. Examples of excellent materials for the core are boron oxide ($1.4 \times 10^{-6} K^{-1}$), borosilicate glasses having at least about 20 percent and preferably at least 30 percent of the total glass composition weight of boron oxide, barium borate glass having from 30 to 50 weight percent and preferably 35 to 45 weight percent of barium oxide. Silica phosphate glasses having at least about 30 percent and preferably 40 percent of the total glass composition weight of $P_2O_5$, barium borate-boron oxide glasses, glasses having at least about 50 weight percent barium borate, boron oxide, or both and at least two from the group consisting of alumina, sodium oxide, and potassium oxidel. A preferred glass comprises 63 to 68 weight percent of $SiO_2$, 3 to 4 weight percent of NaO, 16 to 22 weight percent of $K_2O$, 3 to 4 weight perccent of $Na_2O$, 16 to 20 weight percent of $K_2O$, 3 to 4 weight percent of BaO, 1 to 2 weight percent of PbO, 3 to 4 weight percent of $Nd_2O_3$, and 3 to 4 weight percent of $Sb_2O_3$. Many additional glasses can be used. Plexiglass would be an excellent core material with a parameter equalled to about $-2.5 \times 10^{-6} K^{-1}$, but the port optical clarity of presently available plexiglass prevents any extensive use of this material. The widely used silica at about $6.3 \times 10^{-6} K^{-1}$ is too high to produce a fiber with any appreciable degree of temperature insensitivity.

The cladding material generally has a lower index of refraction in order to reduce signal loss through the surface of the fiber. Processing the fiber is generally improved if the cladding material is the same type of material as the core, but there is no requirement for this similarity. The optical clarity of the material is not important. Except for the Poisson's ratio, the choice of material is made in accordance with standard considerations. The Poisson's ratio of the material is about equal (within about 10 percent) of that of the core material. The thickness of the cladding layer is at least about one-half of the radius of the core. If the fiber is to be used as a sensor, the thickness is from one-half to five times the radius of the core. Such a thickness has some attenuation of the signal passing through the fiber, but the short lengths of fiber used in sensors make the loss unimportant. For communications, the thickness should at least be about 15 times the radius of the core.

The term substrate comes from the usual way fibers are prepared. A cladding layer is placed on the inside surface of a tube of the type of material as the cladding. Again matching the materials can improve processing, but there is no requirement for this. Then the center is filled with the core material and the composite is processed into fibers. In the usual fiber the substrate provides physical strength but has little effect on the fiber's optical performance. With the fibers of the present invention, the substrate contributes much to the temperature insensitivity of the fiber by reducing the axial strain in the core without affecting the radial strain of the core.

The coefficient of thermal expansion of the substrate layer is not more than about one fourth, preferably not more than one tenth, and most preferably not more than one twenty-fifth of that of the core. The Young's modulus of the substrate layer is greater than that of the core and preferably about from 20 to 50 percent greater. The Poisson ratio is within 25 percent of that of the core. In order ensure that this layer is large enough to exert a significant force on the axial strain of the core, the thickness should at least be equal to about one and one-half times the radius of the core and preferably at least five times and most preferably ten times greater than the core radius. Examples of suitable substrate material are silica, borosilicate glasses, with no more than 5 weight percent of $B_2O_3$, silica with 4 to 10 percent of total glass composition weight of titanium, silicanitrate glasses with at least about 90 percent of the total glass composition weight of silica, and certain ceramics. As can be seen many materials are suitable so long as the axial thermal expansion of the substrate is much less than that of the core.

The protective layer protects the fiber from moisture, chemical attack, and damages from handling the fibers. Since the non-glass material has an extremely large thermal expansion, it is necessary for the material to be elastomeric; so that, the material can deform and thereby minimize the force being exerted on the optical fiber. The Young's modulus of the material is at least about $1 \times 10^{-3}$ times that of the core, preferably $1 \times 10^{-4}$ times and most preferably $1 \times 10^{-6}$ times that of the core. The Poisson ratio is from 0.48 to 0.52. Preferably the thickness is at least about five times and most preferably at least ten times greater than the radius of the core. Examples of suitable elastomers are cis polyisoprene, polybutadiene, butyl rubber, and silicone rubbers.

The fibers are fabricated in the usual manner. Any of the commonly used methods would be suitable.

Having described the invention in general the following examples are given by way of illustration and are not meant to limit this disclosure or the claims to follow in any manner.

TABLE I

|  | Core-1 | Core-2 | Clad | Substrate | Coating |
|---|---|---|---|---|---|
| Composition | Nd-laser glass | Barium Borate | 95% $SiO_2$ + 5% $B_2O_3$ | $SiO_2$ | Silicone Rubber |
| Diameter ($\mu$m) | 4 | 4 | 30 | 90 | 190 |
| Young's modulus ($10^{10}$ dyne/cm$^2$) | 61.5 | 65.4 | 50.76 | 72.45 | 0.0035 |
| Posisson's ratio | 0.226 | 0.290 | 0.219 | 0.17 | 0.49947 |
| Thermal expansion coefficient ($10^{-7}$/°C.) | 97 | 60 | 17 | 5.5 | 1500 |
| Refactive index n | 1.52 | 1.58 |  |  |  |
| $\frac{1}{n}\left(\frac{\partial n}{\partial T}\right)_p$ ($10^{-5}$/°C.) | 0.45 | 0.44 |  |  |  |

The composition of the neodymium laser glass (core—1) is given in Waxler et al. J. Res NBS 75A:3, May-June 1971 at p. 173. The glass is identified as glass -D and comprises 66.3 weight percent of $SiO_2$, 3.4 weight percent of $Na_2O$, 18.2 weight percent of $K_2O$, 3.5 weight percent of BaO, 1.8 weight percent of PbO, 3.5 weight percent of $Nd_2O_3$, and 3.2 weight percent of $Sb_2O_3$.

The composition of the barium borate glass (Core—2), designated as barium borate E-1583, is given in Waxler et al. J. Res. NBS 77A;6, Nov.-Dec. 1973 at p. 756 and comprises 59 weight percent of $B_2O_3$ and 41 weight percent BaO.

As the table shows, the fibers are identical except for the core material. The fiber with core—1 has greater temperature insensitivity than the one with core—2, but both are more than four times more insensitive than optical fibers with a silica core and substrate and a hard plastic coating. Additional details concerning the temperature insensitive fibers of this invention are given in N. Lagakos and J. A. Bucaro "Minimizing Temperature Sensitivity of Optical Fibers" App. Optics 20, p. 3276-8, Oct. 1, 1981 which is incorporated herein.

Obviously, many modifications and variations of the present invention are possible in light of the above teachings. It is therefore to be understood that, within the scope of the appended claims, the invention may be practiced otherwise than as specifically described.

What is claimed is:

1. An optical fiber with reduced temperature sensitivity which comprises:
   a light-propagating core having the factor $$\frac{1}{n}\left(\frac{\partial n}{\partial T}\right)_\rho$$

less than $5.5 \times 10^{-6} K^{-1}$ wherein n represents the index of refraction, T represents the temperature, and $\rho$ represents the density of said core;
   a cladding layer in contact with said core having an index of refraction lower than that of said core, a Young's modulus at least about equal to that of said core, a Poisson's ratio about equal to that of said core, and a thickness equal to at least about one-half of the radius of said core;
   a substrate layer in contact with said cladding layer having a Young's modulus greater than that of said core, a Poisson ratio within about 25 percent of that of said core, a thickness at least about one and one-half times greater than the radius of said core, and a coefficient of thermal expansion of not more than one fourth of that of said core; and
   at least one protective coating layer in contact with said substrate layer having a Young's modulus not in excess of about $1 \times 10^{-3}$ times that of said core and a Poisson ratio from about 0.48 to about 0.52.

2. The fiber of claim 1 wherein the thickness of said cladding layer is from one half to five times the radius of said core and the coefficient of thermal expansion of said substrate layer is no more than one tenth of that of said core.

3. The fiber of claim 2 wherein the Young's moduli of said protective coatings are not greater than $1 \times 10^{-4}$ times that of said core and the total thickness of said protective coatings is at least five times the radius of said core.

4. The fiber of claim 3 wherein the Young's moduli of said protective coatings are not greater than $1 \times 10^{-6}$ times that of said core, the total thickness of said protective coatings is at least ten times the radius of said core, and the coefficient of thermal expansion of said substrate layer is no more than one twenty fifth of that of said core.

5. The fiber of claim 4 wherein said core consists essentially of a glass selected from the group consisting of boron oxide, borosilicate glass having at least about 20 weight percent of boron oxide, barium borate glass having from about 30 to about 50 weight percent of barium oxide, silica phosphate glass having at least about 30 weight percent of $P_2O_5$, glasses consisting essentially of barium borate and boron oxide, glasses having at least about 50 weight percent barium borate, boron oxide or both and at least two from the group consisting of aluminum, sodium oxide, and potassium oxide.

6. The fiber of claim 4 wherein said core consists essentially of a glass selected from the groups consisting of boron oxide, borosilicate glass having at least 30 weight percent of boron oxide, and barium borate glass having from 35 to 45 weight percent of barium oxide.

7. The fiber of claim 4 wherein said core consists of a glass comprising 63 to 68 weight percent of $SiO_2$, 3 to 4 weight percent of NaO, 1 to 2 weight percent of PbO, 3 to 4 weight percent of BaO, 3.5 weight percent of $Nd_2O_3$ and 3 to 4 weight percent of $Sb_2O_3$.

8. The fiber of claim 1 wherein the thickness of said cladding layer is at least equal to fifteen times the radius of said core and the coefficient of thermal expansion of said substrate layer is no more than one tenth of that of said core.

9. The fiber of claim 8 wherein the Young's moduli of said protective coatings are not greater than $1 \times 10^{-4}$ times that of said core and the total thickness of said protective coatings is at least five times the radius of said core.

10. The fiber of claim 9 wherein the Young's moduli of said protective coatings are not greater than $1 \times 10^{-6}$ times that of said core, the total thickness of said protective coatings is at least ten times that of said core, and the coefficient of thermal expansion of said substrate layer is no more than one twenty fifth of that of said core.

11. The fiber of claim 10 wherein said core consists essentially of a glass selected from the group consisting of boron oxide, borosilicate glass having at least about 20 weight percent of boron oxide, barium borate glass having from about 30 to about 50 weight percent of barium oxide, silica phosphate glass having at least about 30 weight percent of $P_2O_5$, glasses consisting essentially of barium borate and boron oxide, glasses having at least about 50 weight percent barium borate, boron oxide or both and at least two from the group consisting of aluminum, sodium oxide, and potassium oxide.

12. The fiber of claim 10 wherein said core consists essentially of a glass selected from the group consisting of boron oxide, borosilicate glass having at least 30 weight percent of boron oxide, and barium borate glass having from 35 to 45 weight percent of barium oxide.

13. The fiber of claim 10 wherein said core consists of a glass comprising 63 to 68 weight percent of $SiO_2$, 3 to 4 weight percent of NaO, 1 to 2 weight percent of PbO, 3 to 4 weight percent of BaO, 3.5 weight percent of $Nd_2O_3$ and 3 to 4 weight percent of $Sb_2O_3$.

* * * * *